US008996835B2

(12) United States Patent
Strutt (10) Patent No.: US 8,996,835 B2
(45) Date of Patent: Mar. 31, 2015

(54) APPARATUS AND METHOD FOR PROVISIONING STORAGE TO A SHARED FILE SYSTEM IN A STORAGE AREA NETWORK

(75) Inventor: Stephen P. Strutt, Feltham (GB)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 12/558,729

(22) Filed: Sep. 14, 2009

(65) Prior Publication Data

US 2010/0070732 A1 Mar. 18, 2010

(30) Foreign Application Priority Data

Sep. 15, 2008 (EP) .................................... 08164343

(51) Int. Cl.
*G06F 12/00* (2006.01)
*G06F 3/06* (2006.01)

(52) U.S. Cl.
CPC ............ *G06F 3/0665* (2013.01); *G06F 3/0605* (2013.01); *G06F 3/067* (2013.01)
USPC ........................................................ 711/170

(58) Field of Classification Search
USPC ........................................................ 711/170
See application file for complete search history.

(56) References Cited

U.S. PATENT DOCUMENTS

| | | | |
|---|---|---|---|
| 5,666,486 A * | 9/1997 | Alfieri et al. .................. | 709/217 |
| 6,023,706 A | 2/2000 | Schmuck et al. | |
| 6,032,216 A | 2/2000 | Schmuck et al. | |
| 6,748,429 B1 | 6/2004 | Talluri et al. | |
| 6,990,478 B2 | 1/2006 | Loy et al. | |
| 7,010,532 B1 | 3/2006 | Stakutis et al. | |
| 7,272,059 B2 | 9/2007 | Vimercati et al. | |
| 2002/0175938 A1* | 11/2002 | Hackworth ................... | 345/751 |
| 2003/0074599 A1* | 4/2003 | Golasky et al. .................... | 714/6 |
| 2005/0223005 A1 | 10/2005 | Shultz et al. | |
| 2006/0075199 A1 | 4/2006 | Kallahalla et al. | |
| 2006/0230086 A1* | 10/2006 | Devarakonda et al. ....... | 707/205 |
| 2006/0236068 A1 | 10/2006 | Li et al. | |
| 2006/0253658 A1 | 11/2006 | Mathieu et al. | |
| 2007/0283119 A1 | 12/2007 | Sarkar et al. | |

* cited by examiner

*Primary Examiner* — Larry Mackall
(74) *Attorney, Agent, or Firm* — Douglas A. Lashmit; Hoffman Warnick LLC (57) ABSTRACT

A provisioning apparatus for provisioning a storage volume to a shared file system in a storage area network, wherein the storage area network comprises a plurality of server nodes and a plurality of storage devices, wherein each server node comprises a shared file system operable for sharing by each of the plurality of server nodes and each server node is operable for communicating with each of the plurality of storage devices, the apparatus comprising: a creator component creates a new storage volume; a messenger component instructs the server nodes to detect the new storage volume and to allocate a device name; an instructor component instructs the shared file system to assign the storage volume to the shared file system; an instructor component associates the device name with the shared file system; a receiver component receives a unique identifier for the storage volume and the device name; and a builder component for determines a relationship between the unique identifier and the device name, storing the relationship in the provisioning apparatus.

19 Claims, 7 Drawing Sheets

APPARATUS AND METHOD FOR PROVISIONING STORAGE TO A SHARED FILE SYSTEM IN A STORAGE AREA NETWORK

TECHNICAL FIELD

The invention relates to the field of storage area networks (SANs). In particular, the invention relates to a method and apparatus for provisioning of storage to a shared file system in a SAN.

RELATED ART

A Storage Area Network (SAN) is a dedicated computer network for attaching external hardware storage devices (for example, hard disk drive arrays and tape-drives) to a group of server nodes. This is achieved in such a way that the hardware storage devices appear as locally attached hardware storage devices to the operating system (OS) of each server node. By sharing the storage in a data center environment, the tasks involved in storage administration are greatly simplified. Examples of such tasks comprise the addition of new storage volumes as storage requirements increase, and the addition of new servers to the SAN. The OS within each server node views a unit of storage attached to a SAN as a physical volume. The physical volume may be consolidated into volume groups within the volume manager of the OS. A physical storage device may contain one or multiple storage volumes. With the addition of virtualization or Redundant Array of Inexpensive Disks (RAID) layers, a physical storage device may comprise one or more logical storage volumes. Using a volume manager, an OS uses a file system in order to organize the computer files and data held on the storage volumes.

One or more servers attached to a SAN commonly use a shared file system (also known as a clustered file system) so that a plurality of servers can share the same logical storage volume and hence share the data on the storage volume. The shared file system manages access permissions and serialization of read and write access to ensure consistency of the data on the shared file system. With the correct access rights each server is able to obtain concurrent high performance direct access to data held on the storage volume as if the server was the only user of the data.

As storage requirements for capacity change, a file system needs to be updated to reflect changes to the hardware storage devices available to the file system. For the avoidance of doubt the term "provisioning" is used to describe operations performed within a SAN system to enable a file system to use a storage volume. Such provisioning is a common task for storage administrators, however it is time consuming, prone to errors and requires meticulous record keeping to keep track of the mapping between each storage volume and each server node. Solutions already exist to perform this end-to-end provisioning of storage for non-shared file systems in a server environment. In the case of a non-shared file system, to ensure data integrity and to validate successful operation, storage provisioning tools correlate unique identification information about the storage volume as viewed by the hardware storage device with information about the same storage volume as viewed by the executing OS on the server node. This ensures that when an operation is performed by an OS operation and a non-shared file system as part of the end-to-end storage provisioning process, the operations are performed on the same storage volume. Failure to successfully correlate the storage volume information from the two different views of the storage volume will result in the operation being aborted due to the potential risk of data corruption caused by overwriting data on the wrong storage volume. However, no such end-to-end solution exists for the provisioning case of a shared file system, where a storage volume is accessed by multiple servers.

If a shared file system needs to be created or extended, a storage volume needs to be allocated from a storage subsystem to all server nodes that use the shared file system. Typically, a storage volume is first assigned to a first server node of the shared file system, physically discovered by the first server node and then the shared file system is configured with the new storage volume. The new storage volume is then mapped to the other server nodes of the shared file system, and physically rediscovered on these server nodes to make the new storage volume accessible to all server nodes as part of the shared file system. There is an additional requirement to keep track of the state of the hardware storage devices involved in such a relationship in order to reduce the risks of mistakes and to facilitate the addition of new server nodes or additional storage volumes. Typically, manual tools (for example, using command line interface (CLI) commands) are used to provision a new storage volume to the first server node, and subsequently used to provision the new storage volume to the subsequent server nodes. The drawback of this approach is that the configuration and the related tracking are time consuming, and are error prone.

SUMMARY OF THE INVENTION

Viewed from a first aspect, the present invention provides a provisioning apparatus for provisioning a storage volume to a shared file system in a storage area network, wherein the storage area network comprises a plurality of server nodes and a plurality of storage devices, wherein each server node comprises a shared file system operable for sharing by each of the plurality of server nodes and each server node is operable for communicating with each of the plurality of storage devices, the apparatus comprising: a creator component for transmitting an instruction to one of the plurality of storage devices to create a new storage volume; a messenger component for instructing one of the plurality of server nodes to detect the created storage volume and to allocate a device name to the created storage volume; an instructor component for instructing one of the plurality of server nodes to assign the created storage volume to a shared file system; an instructor component for associating the device name with the shared file system; a receiver component for receiving a first identifier associated with the created storage volume and a second identifier associated with the device name of the created storage volume; and a builder component for determining from the received first identifier and the received second identifier a relationship between the created storage volume and one of the plurality of server nodes sharing the shared file system.

Advantageously, the present invention provides for the correct assignment of storage volumes to a shared file system in a storage area network. A correlation between a unique identifier returned from a storage volume, and the corresponding information as viewed by one of the server nodes sharing the file system, determines a relationship between the storage volume and the shared file system. Where multiple volumes are provisioned at the same time, correlation enables the unique identification of each volume such that it can be correctly allocated to the shared file system. The use of the apparatus initiates storage volume discovery by all server nodes sharing the shared file system.

The present invention provides an apparatus wherein the apparatus further comprises: a messenger component for instructing each of the plurality of server nodes to detect the created storage volume and to allocate a device name to the created storage volume on each of the plurality of server nodes; an instructor component for associating the device name on each of the plurality of server nodes with the shared file system; a receiver component for receiving a plurality of second identifiers associated with the device name of the created storage volume on each of the plurality of server nodes; and a builder component for determining from the received first identifier and the plurality of received second identifiers a relationship between the created storage volume and the shared file system.

Advantageously, the present invention provides for a correlation between a unique identifier returned from a storage volume, and the corresponding information as viewed by all of the server nodes sharing the file system, to determine a relationship between the storage volume and the shared file system. This allows correct assignment of storage volumes to all server nodes sharing a shared file system, when the shared file system does not support a first server node writing a shared file system identifier on the storage volume for the other server nodes to identify the storage volume as being a member of the shared file system.

The present invention provides an apparatus wherein the builder component further comprises: a component for updating a first record associated with the shared file system, and wherein the first record comprises a component for a second record associated with the received first identifier, a component for a third record associated with the second received identifier, and a component for a plurality of fourth records associated with each of a plurality of server nodes.

Advantageously, the present invention provides a component for storing information associated with the shared file system in a first record; about the storage volume in a second record; about the first of the server nodes in a third record; and about the other server nodes sharing the shared file system in a set of fourth records. Storing the information for use by the apparatus allows for future storage administration operations to be based on accurate information without the requirement for time consuming information rediscovery. Examples of storage administration operations are: creating a new shared file system for a new or existing cluster of server nodes; adding a new server node to a shared file system; removing a server node; and, reducing or removing a shared file system.

The present invention provides an apparatus wherein: the first record is a modified volume container for storing a relationship between the created storage volume and the shared file system; the second record is a storage volume record; the third record is a server node record; and the fourth record is a server node record.

The present invention provides an apparatus wherein the storage volume is a physical volume or a logical volume.

Advantageously, the present invention provides support for storage volumes to be either physical or logical, for example raw storage volumes, RAID storage volumes, or virtualized storage volumes.

The present invention provides an apparatus wherein one of the plurality of server nodes is a master node of the shared file system.

Advantageously, the present invention provides support for shared file systems that have a master node as the managing server node of the shared file system.

The present invention provides an apparatus wherein the apparatus further comprises: a detector component for detecting changes to a device associated with the storage area network system.

Advantageously, the present invention provides for changes in the SAN system to be detected by the apparatus automatically, and automatic storage provisioning operations carried out according to defined policies.

The present invention provides an apparatus wherein the apparatus further comprises: a transmitter component for transmitting an instruction to a device associated with the storage area network system for creating a communication path between the plurality of server nodes associated with the storage area network system and the storage volumes associated with the storage area network system.

Advantageously the present invention provides for the apparatus to configure the storage devices, the server nodes and the SAN fabric devices for the successful provisioning, without the requirement for separate means for establishing the communication paths.

Viewed from a second aspect, the present invention provides a method for provisioning a storage volume to a shared file system in a storage area network, wherein the storage area network comprises a plurality of server nodes and a plurality of storage devices, wherein each server node comprises a shared file system operable for sharing by each of the plurality of server nodes and each server node is operable for communicating with each of the plurality of storage devices, the method comprising: transmitting an instruction to one of the plurality of storage devices to create a new storage volume; instructing one of the plurality of server nodes to detect the created storage volume and to allocate a device name to the created storage volume; instructing one of the plurality of server nodes to assign the created storage volume to a shared file system; associating the device name with the shared file system; receiving a first identifier associated with the created storage volume and a second identifier associated with the device name of the created storage volume; and determining from the received first identifier and the received second identifier a relationship between the created storage volume and one of the plurality of server nodes sharing the shared file system.

Advantageously the present invention provides a method for successful storage provisioning to a shared file system wherein correlation information is only established on one of the server nodes supporting the shared file system, without the requirement to complete correlation on all server nodes support the shared file system.

The present invention provides a method wherein the method further comprises: instructing each of the plurality of server nodes to detect the created storage volume and to allocate a device name to the created storage volume on each of the plurality of server nodes; associating the device name on each of the plurality of server nodes with the shared file system; receiving a plurality of second identifiers associated with the device name of the created storage volume on each of the plurality of server nodes; and determining from the received first identifier and the plurality of received second identifiers a relationship between the created storage volume and the shared file system.

The present invention provides a method wherein the method further comprises: updating a first record associated with the shared file system, and wherein the first record comprises a second record associated with the received first identifier, a third record associated with the second received identifier, and a plurality of fourth records associated with each of a plurality of server nodes.

The present invention provides a method wherein the first record is a modified volume container for storing a relationship between the created storage volume and the shared file system; the second record is a storage volume record; the third record is a server node record; and the fourth record is a server node record.

The present invention provides a method herein the storage volume is a physical volume or a logical volume.

The present invention provides a method wherein one of the plurality of server nodes is a master node of the shared file system.

The present invention provides a method wherein the method further comprises detecting changes to a device associated with the storage area network system.

The present invention provides a method wherein the method further comprises transmitting an instruction to a device associated with the storage area network system for creating a communication path between the plurality of server nodes associated with the storage area network system and the storage volumes associated with the storage area network system.

Viewed from a third aspect, the present invention provides a computer program product stored on a computer readable storage medium and loadable into the internal memory of a digital computer, comprising software code portions for performing, when said product is run on a computer, the invention as described above.

BRIEF DESCRIPTION OF THE DRAWINGS

The present invention will now be described, by way of example only, with reference to various embodiments, as illustrated in the following figures.

DETAILED DESCRIPTION OF THE INVENTION

Figure 1:
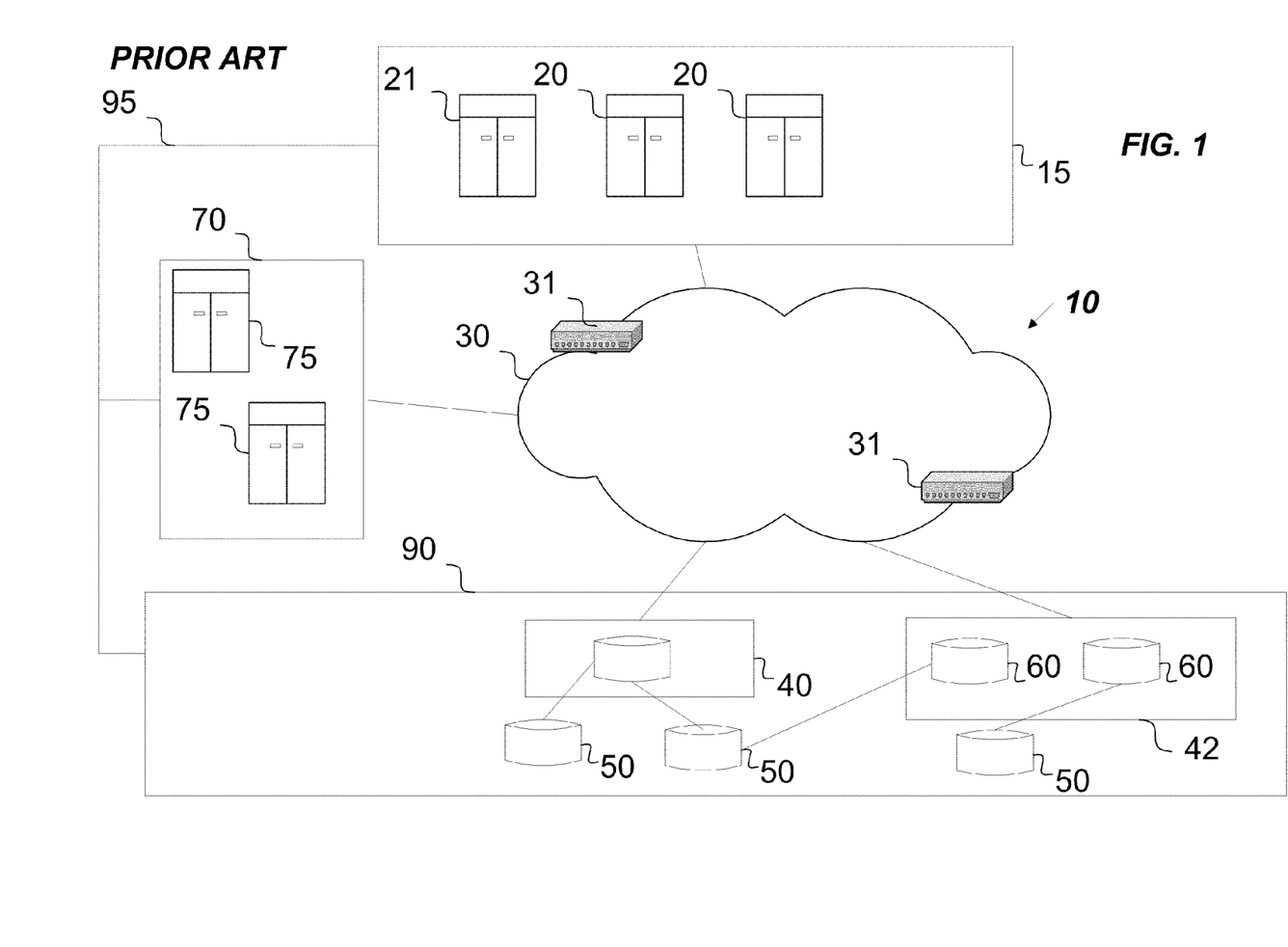
FIG. 1 is a block diagram depicting a prior art networked computer storage system in which the present invention may be embodied.

FIG. 1 is a block diagram depicting a storage area network (SAN) system 10 in which the present invention may be embodied. The illustrated SAN system 10 comprises a server node subsystem 15 having a set of server nodes 20, which are connectable through a SAN fabric 30 to a back-end storage subsystem 90. A SAN fabric 30 typically comprises SAN fabric devices 31, for example switches, and cabling that connect server node subsystems 15 to hardware back-end storage subsystems 90.

The server node subsystems 15 may comprise a server node 21 operable as a master node 21 to manage a shared file system that is shared by the server nodes 20, 21. The storage subsystem 90 may comprise a variety of physical storage devices having, for example, stand-alone Just a Bunch of Disks (JBOD) devices 50, RAID devices 40 and virtualization devices 42. The storage devices 40, 42, 50 may be presented to the server node subsystem 15 as a set of storage volumes 60. For the avoidance of doubt, the term "storage volume" 60 will be used to describe physical or logical storage volumes as presented by the storage subsystem 90 to the server node subsystem 15. Typically the SAN system 10 is managed by a management subsystem 70 comprising management servers 75, connectable to the server node subsystem 15, the storage subsystem 90, and the SAN fabric devices 31 through the SAN fabric 30 or through a separate Local Area Network (LAN) 95.

Figure 2:
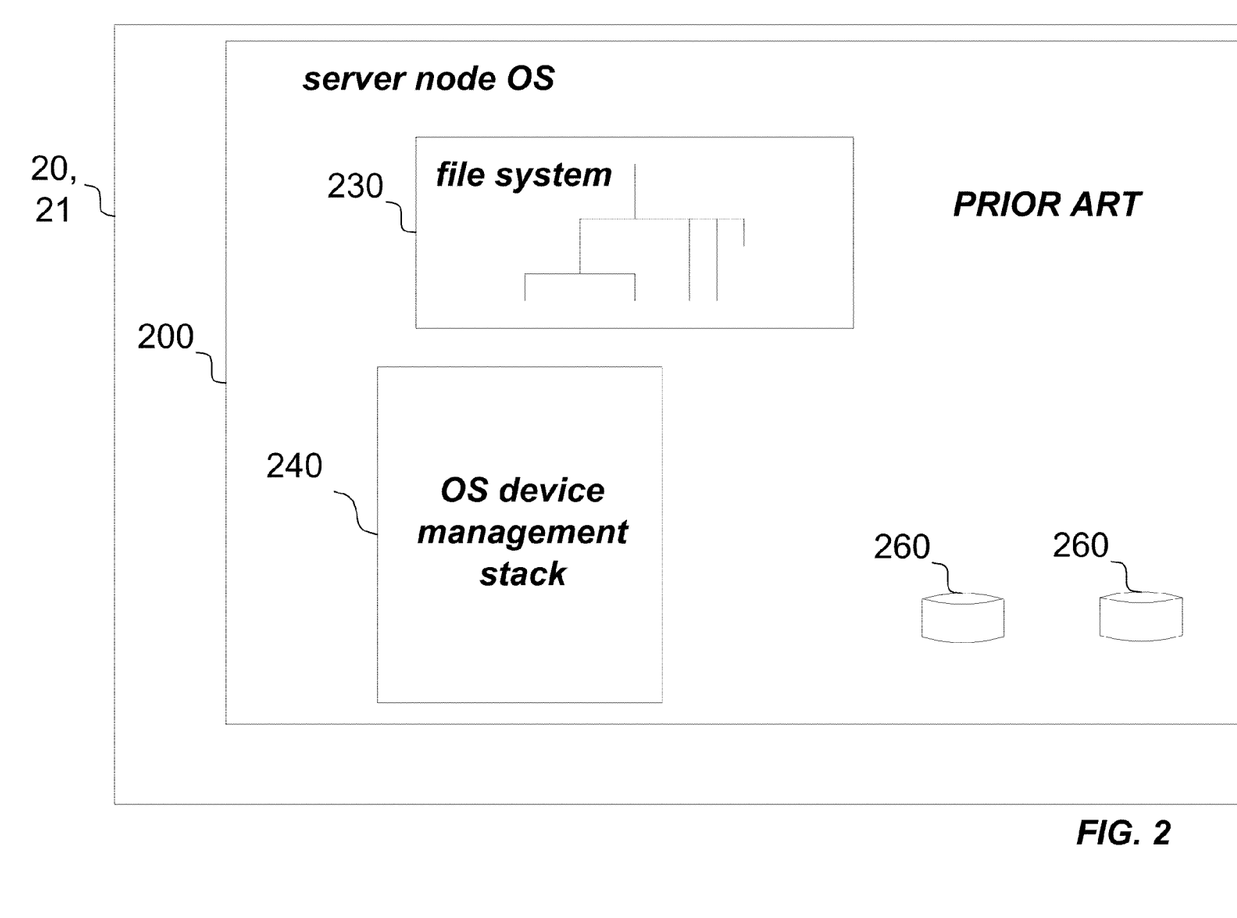
FIG. 2 is a block diagram depicting components within a prior art server node operating system.

With reference to FIG. 2, a plurality of hardware and software components is shown operable on server node 20, 21, which interact to manage the storage requirements of the server node 20, 21. Typically, a file system 230 is a software component which interacts with the server node operating system (OS) 200 device management stack. The OS 200 typically views the attached storage volume 60 as a physical volume 260. For the avoidance of doubt, the term "physical volume" 260 will be used to describe the OS 200 view. The server node OS 200 creates a file system 230 on one or each of these physical volumes 260. In response to a data transfer request to a storage volume 60 from a software application, the OS 200 constructs and transmits appropriate hardware specific commands to complete the data request. The use of the OS 200 to handle data transfers to and from the storage volume 60 allows software applications to use the file system 230 without having to have detailed knowledge of an attached storage subsystem 90.

Figure 3:
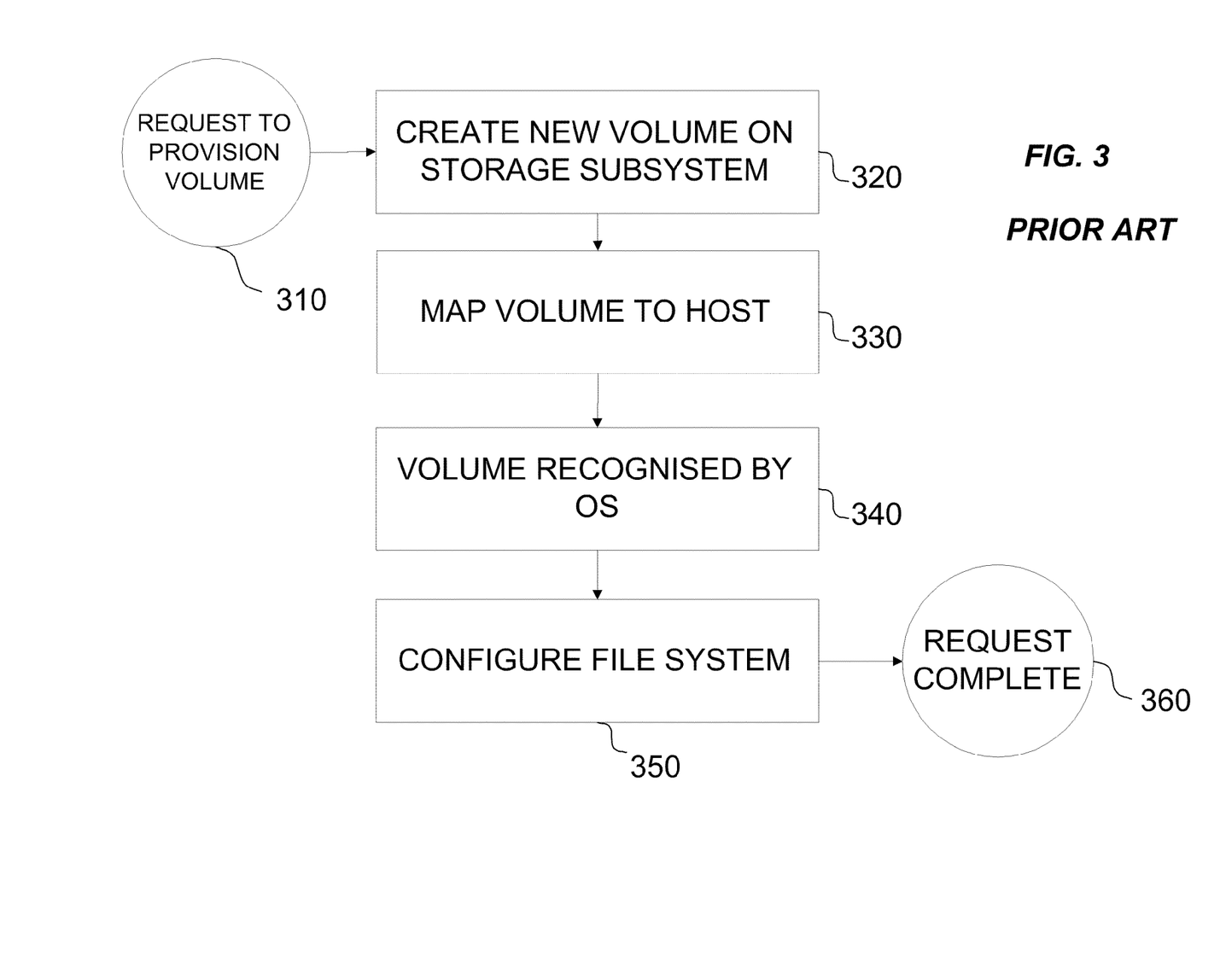
FIG. 3 is a high-level flow diagram depicting a method as known in the art required to provision a storage volume to a non-shared file system.

FIG. 3 is a high-level flow diagram depicting typical operation steps performed to provision a new storage volume 60 to a server node 20, 21 supporting a non-shared file system 230. For example, in response to a requirement for additional storage to be allocated to the non-shared file system 230 by the users of the non-shared file system 230. The term "provisioning" is used to describe operations performed to enable a storage volume 60 to be used by a server node 20, 21 supporting a file system 230. Following a provisioning request 310 for additional storage by the users of the non-shared file system 230, the first step 320 for the storage administrator is to configure a hardware storage device 40, 42, 50 to create a new storage volume 60 on a storage device 40, 42, 50. The storage device 40, 42, 50 is instructed to create a storage volume 60, and is queried for the unique IEEE Unique Identification (UID) or serial number for the created storage volume 60. At step 330 hardware connection paths, between the server node 20, 21 and the storage subsystem 90, are enabled to allow the server node 20, 21 physical access to the storage volume 60. The hardware connection paths are enabled through such techniques as LUN masking, SAN switch zoning, and mapping of the ports of the server node 20, 21 to the storage subsystem 90 that comprises the storage volume 60. Step 330 enables the server node 20, 21 to have a hardware connection enabled to the storage volume 60.

At step 340, the server node OS 200 is instructed to discover the newly allocated storage volume 60. The server node OS 200 scans its physical buses and identifies the newly allocated storage volume 60 and creates a new device name for a physical volume 260 with which it will refer to the storage volume 60. An example of a device name is "\dev\hdisk21\". At step 350, the server node OS 200 configures the non-shared file system 230 by adding the physical volume 260 to the non-shared file system 230. A software application using the non-shared file system 230 may now perform read and write operations to the additional storage space provided by storage volume 60. The OS 200 server node 20, 21 may also write a signature of the non-shared file system 230 on the storage volume 60. Provisioning of a new storage volume 60 to a server node 20, 21 is now complete 360. Software applications using the non-shared file system 230 on the server node 20, 21 may now perform read and write operations to the storage volume 60.

Figure 4:
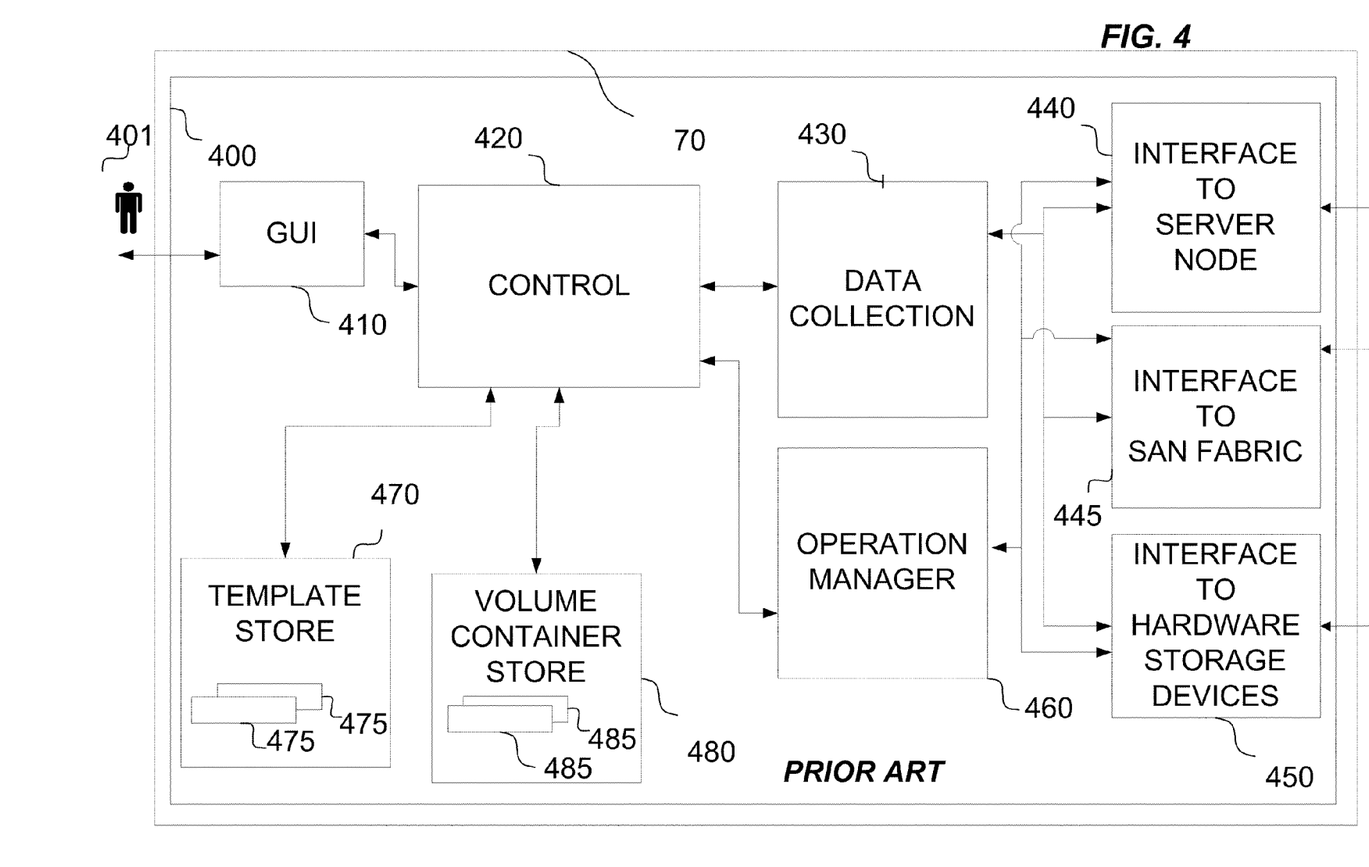
FIG. 4 is a block diagram depicting a prior art storage provisioning tool.

FIG. 4 depicts a prior art storage provisioning tool 400 that may be used to carry out the steps illustrated in FIG. 3. The storage provisioning tool 400 is operable for running on a management subsystem 70 connectable to the SAN system 30 through a LAN 95 or the SAN fabric 30. The storage provisioning tool 400 comprises the following components that interact with each other to provide storage provisioning to a non-shared file system 230. A control component 420 is the main processing component of the storage provisioning tool 400, operable for data manipulation and control of the storage provisioning tool 400 operations.

A template store component 470 is operable for storing and retrieving templates 475. A storage administrator 401 interacts with the control component 420 through a graphical user interface (GUI) 410. The storage administrator 401 accesses a template 475, stored in the template store component 470 to specify the required characteristics of a storage volume 60 for a non-shared file system 230. A template 475 is a data file that comprises a set of default storage setting parameters that may be used by the storage administrator 401. The values in the template 475 are used to define input parameters to storage administration tasks initiated by the storage administrator 401. The use of a template 475 for repetitive storage administration tasks avoids the need to specify new input parameters every time a storage administration task is repeated. An example of a storage administration task is a task to create a new storage volume of 1 GB. A storage administration task may be performed by a plurality of low level storage administration commands.

The data collection component 430 is operable for collecting information from the SAN system 10 by sending a data request to subsystems 15, 30, 90 in the SAN system 10 and subsequently receiving data responses from subsystems 15, 30, 90. Alternatively, subsystems 15, 30, 90 may broadcast updated status information through the SAN fabric 30 or the LAN 95, which the data collection component 430 receives. An operation manager 460 is operable for controlling the transmission of a storage administration command created by the control component 420 of the storage provisioning tool 400, by transmitting subsystem 15, 31, 90 device specific commands through interfaces 440, 445, 450 to the SAN system 10. A volume container store component 480 is operable for storing volume containers 485. A volume container 480 is a data file that comprises information about the storage volume 60 mapped to a server 20, 21 and their usage by the OS 200. The data collection component 430 and the operation manager 460 control access to the SAN system 10 through the following components: an interface 440 to a server node 20, 21; an interface 445 to the SAN fabric 30; and, an interface 450 to the storage subsystem 90.

To ensure the steps of provisioning are performed correctly, the storage provisioning tool 400 requires accurate information about the SAN system 10. This is not only important during the provisioning of a new storage volume 60, but also when changes occur within the subsystems 15, 30, 70, 90. For example, when storage volumes 60 are removed from the storage devices 40, 42, 50, or new server nodes 20 are added to the server node subsystem 15. The storage provisioning tool 400 sets up a volume container 480 as an internal data structure to keep track of relationships between storage volumes 60 and physical volumes 260 in the non-shared file system 230. Information from the SAN system 10 may be provided to the storage provisioning tool 400 as a result of an information request initiated by the storage provisioning tool 400.

Figure 5:
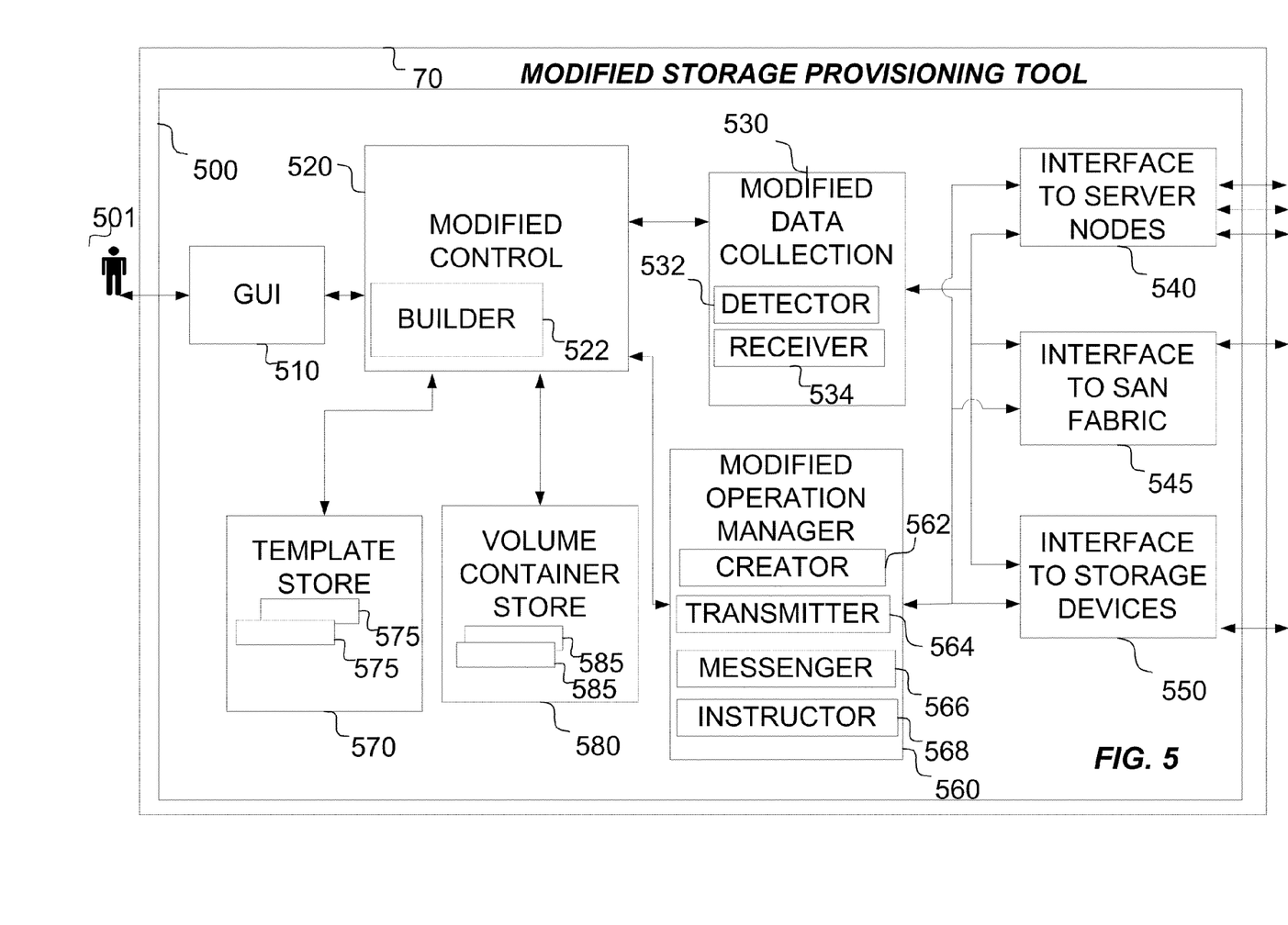
FIG. 5 is a block diagram depicting the storage provisioning tool in accordance with an embodiment of the present invention.

FIG. 5 is a block diagram depicting a modified storage provisioning tool 500 in accordance with an embodiment of the present invention. The modified storage provisioning tool 500 is operable on a management subsystem 70, but may be operable on any of the server nodes 20, 21. The modified storage provisioning tool 500 comprises the following components, which interact with each other to provide storage provisioning to a shared file system. Each component will be described in more detail.

A modified control component 520 is the main processing component of the modified storage provisioning tool 500, operable for data processing and controlling the storage provisioning tool 500 operations. The modified control component 520 further comprises a builder component 522. The builder component 522 correlates storage volume 60 UID information with the device name of a corresponding physical volume 260 on a master node 21 of a shared file system 230, storing a resulting correlation of a mapping from the storage volume 60 to the device name in a modified volume container 585 in the volume container store component 580.

A storage administrator 501 accesses the modified storage provisioning tool 500 through the GUI 510. A template store component 470 is operable for storing and retrieving templates 575. The storage administrator 501 may use a template 575, stored in a template store component 570, to specify the required characteristics of a storage volume 60 for a shared file system 230.

A modified data collection component 530 is operable for collecting information from a SAN system 10. The modified data collection component 530 comprises a detector component 532 for detecting changes to the SAN system 10 components, and a receiver component 534 for receiving information requested by the modified storage provisioning tool 500 from the SAN system 10. Data collected by the modified data collection component 530 is passed to the modified control component 520 for data processing.

The modified operation manager component 560 is operable for managing any storage management operations initiated by the modified control component 520. The modified operation manager component 560 further comprises the following components: a creator component 562 for communicating instructions to a storage subsystem 90; a transmitter component 564 for communicating instructions to server node subsystems 15, SAN fabric devices 31, and, storage subsystems 90; a messenger component 566 for communicating instructions to the server node subsystem 15; and, an instructor component 568 for communicating instructions to server node subsystem 15. The modified data collection component 530 and the modified operation manager 560 access the SAN system 10 through: an interface 540 to the server node subsystem 15; an interface 545 to SAN fabric 30; and, an interface 550 to the storage subsystem 90.

Figure 6:
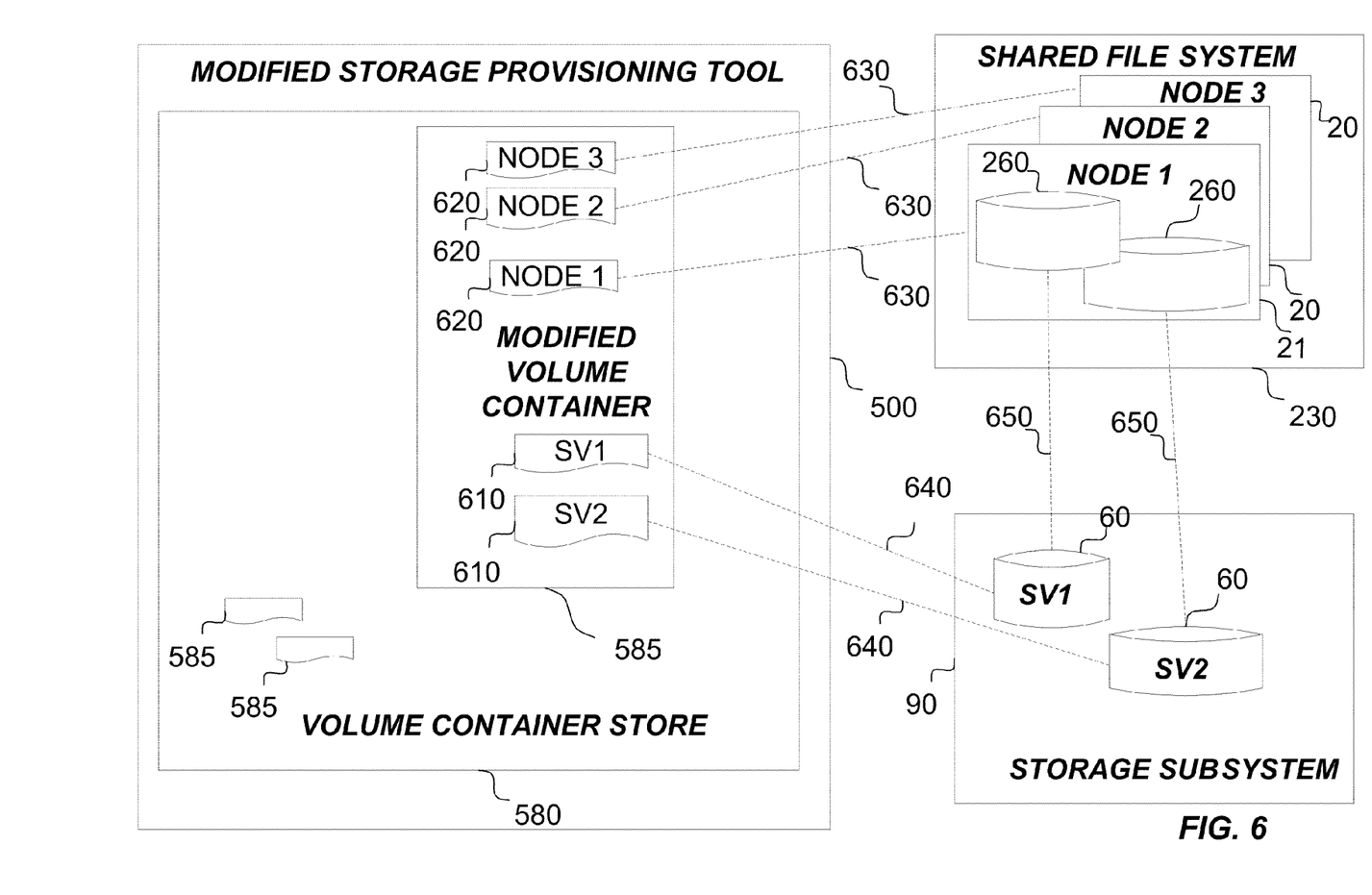
FIG. 6 is a block diagram depicting a modified volume container store of a modified provisioning tool in accordance with an embodiment of the present invention.

FIG. 6 is a block diagram depicting a volume container store 580 of a modified provisioning tool 500 in accordance with an embodiment of the present invention. FIG. 6 also depicts logical relationships 630, 640, 650 between volume containers 585, storage volumes 60, and physical volumes 260 as seen by server nodes 20, 21. The assignment of the storage volumes 60 to the server nodes 20, 21 accessing a shared file system 230 is tracked using the volume container object 585. FIG. 6 depicts an example configuration, but other configurations may be realized by a person skilled in the art without departing from the scope of the invention. The shared file system 230 is shared by master node 21 "Node 1", and two additional server nodes 20 "Node 2" and "Node 3". The storage subsystem 90 has two storage volumes 60 "SV1" and "SV2", which have relationships 650 with two physical volumes 260 in the shared file system 230. The device names of the physical volumes 260 assigned on the master node 21 corresponding to the storage volumes 60 are "\dev\OSdisk1\" and "\dev\OSdisk2\". Equivalent physical volumes 260 for the two storage volumes 60 exist on the other server nodes 20.

A modified volume container store 580 comprises a volume container 585, which comprises a plurality of storage volume records 610, and a plurality of server node records 620. Each storage volume 60 has a relationship 640 with a storage volume record 610. The storage volume record 610 comprises information about the related storage volume 60, for example, the storage volume 60 name "SV1", the storage volume UID, the RAID device 40 on which it is found, the server nodes 20, 21 that it is accessed by, and the device name on the first server node 21 "\dev\OSdisk1\. A server node record 620 for a server node 20, 21 comprises information about the server node 20, 21, for example the name of the server node "Node 1", and a pointer to the storage volumes 60 "SV1" and "SV2" assigned to the server node 20, 21. The server node records 620 have relationships 630 with the server nodes 20, 21. The volume container store 580 may hold other records 585 representing the status of other storage components, for example other file systems 230 supported by the modified provisioning tool 500.

The modified volume container 585 is modified by recording the additional attributes required to manage the process of provisioning storage to all server nodes 20, 21 in the shared file system 230. In an embodiment, storage volume records 610 are extendable with additional attributes above those required to provision a storage volume 60 to a single server node 20. These additional attributes define the additional server nodes 20, 21 that the storage volume 60 is mapped to and the OS 200 device name that the storage volume 60 is known by on the master node 21.

Figure 7:
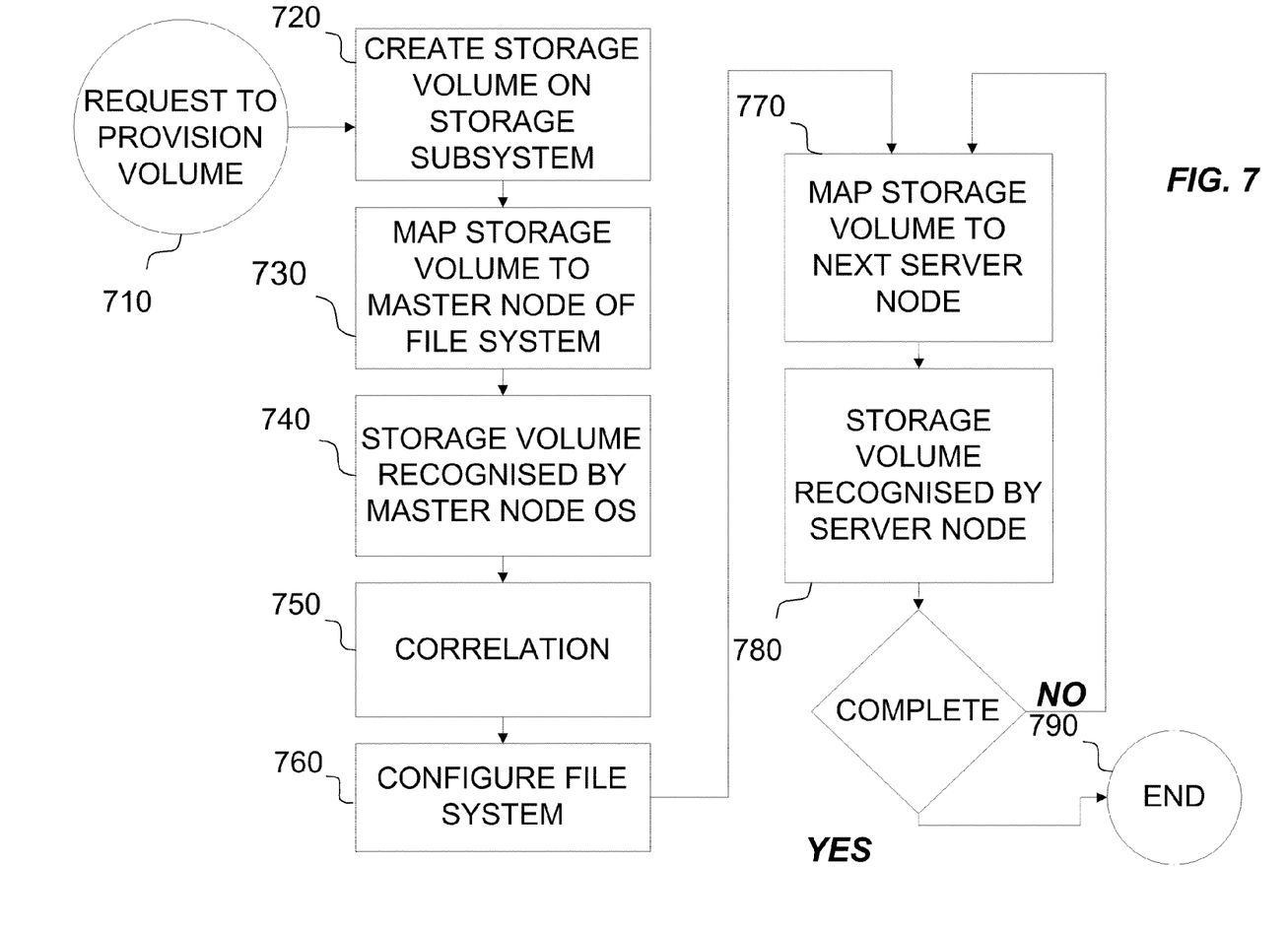
FIG. 7 is a flow diagram depicting the process taken in accordance with an embodiment of the present invention.

FIG. 7 illustrates a flow diagram depicting the steps performed by the modified storage provisioning tool 500 in accordance with an embodiment of the invention. The configuration described in FIG. 6 will be used as an example. Following a storage provisioning request 710, a storage volume 60 is created at step 720. The creator component 562 of the modified storage provisioning tool 500 transmits an instruction to a storage device 40, 42, 50 to create a new storage volume 60 "SV1", and to report back a UID for the storage volume 60. The characteristics of the storage volume 60 to be created may be provided to the modified storage provisioning tool from a template 575. For example, the characteristics may include volume size and the Quality of Service (QoS) characteristics such as availability and performance. The UID information "UID1" is received by the receiver 534 of the modified storage provisioning tool 500, and stored in a volume container 585 within the volume container store 580 along with other characteristics of the storage volume 60 provided by the template 575 or received by a modified data collection component 530.

At step 730 the paths are set up to make the storage volume 60 available to the master node 21 "Node 1" of a shared file system 230. In this step the storage volume 60 is mapped to the master node 21, and the SAN paths are set up so that the master node 21 has access to the storage volume 60 through such techniques as LUN masking and SAN switch zoning. A transmitter component 564 transmits instructions to the master node 21, the SAN fabric 30 and the storage subsystem 90 of the storage volume 60 to set up the paths.

At step 740, the storage volume 60 is discovered by the OS 200 on the master node 21. The messenger component 566 transmits a message to the OS 200 of the master node 21 to scan its physical busses to detect the created storage volume 60, and to report back the device name that the OS 200 on the master node 21 has assigned to it. The OS 200 scans its physical buses, identifies the storage volume 60, creates a corresponding physical volume 260 and then creates a new internal device name with which it will refer to the physical volume 260. The master node 21 transmits the device name of the detected physical volume 260 and the UID of the corresponding storage volume 60, which is received by the receiver component 534 of the modified storage provisioning tool 500. The device name and UID are passed to the builder component 522. In this example, the device name is "\dev\OSdisk1\".

At step 750, the builder component 522 determines a relationship between the storage volume 60 and the device name by a correlation of the storage volume 60 UID stored in storage volume record 610 and UID retrieved for the device name for the master node 21. The new storage volume 60 is securely and reliably identified and correlated to the master node 21 device name for the physical volume 260 using the unique storage volume 60 identifier information such as the IEEE Unique Identifier (UID) or serial number of the storage volume 60. This ensures that when the OS level file system 230 configuration operations are performed as part of the end-to-end storage provisioning process, that they are performed on the correct storage volume. Failure to successfully correlate the storage volume 60 information as recognized by the storage subsystem 90 with the physical volume 260 as recognized by the server node subsystem 15 will result in the operation being aborted due to the potential risk of data corruption caused by overwriting data on the incorrect storage volume 60. The builder component 522 stores the updated volume container 585 with the determined relationship information. The builder component 522 updates a volume container record 585 with updates to a storage volume record 610 for the storage volume 60, and to a server node record 620 for the master node 21. The update to the storage volume record 610 comprises the device name of the physical volume 260 on the master node 21. The update to the server node record 620 comprises a pointer to the assigned storage volume 60. The modified volume container 585 stores the storage volume 60 characteristics and the information that "\dev\OSdisk1\" and "UID1" refer to the same storage volume 60.

At step 760, the instructor component 568 directs the OS 200 to configure the new storage volume 60 as part of the shared file system 230 using the correlated device name "\dev\OSdisk1\". The OS 200 configures the shared file system 230, which also writes a signature of the shared file system 230 on the storage volume 60 to specify membership of the shared file system 230. Typically, the signature includes a shared file system 230 identifier. The signature will also include a shared file system 230 identifier for the storage volume 60, for example "F drive".

After the storage has been provisioned to the master node 21, it is provisioned to each of the other server nodes 20, "Node 2" and "Node 3", sharing the file system 230. At step 770, the paths are set up to make the storage volume 60 available to the next server node 20 "Node 2" of the shared file system 230. In this step 770 the storage volume 60 is mapped to the ports of server node 20 "Node 2", and the SAN paths are set up so that the server node 20 has access to the storage volume 60. The transmitter component 564 transmits instructions to server node 20, the SAN fabric 30 and the storage subsystem 90 of the storage volume 60 to set up the paths.

At step 780, the OS 200 on the server node 20 discovers the storage volume 60. The instructor component 568 directs the OS 200 of the server node 20 to scan its physical busses to detect the created storage volume 60. Server node 20 scans its physical buses, identifies the storage volume 60 and then creates a new internal device name, "\dev\OSdisk1\", with which it will refer to the storage volume. There is no need for the shared file system 230 software on the server node 20 to write a shared file system 230 signature on the storage volume 60, as the master node 21 has already done this. The instructor component 568 directs the OS 200 of the server node 20 to identify the new storage volume 60 with the shared file system 230 signature on it. The shared file system 230 software on the server node OS 200 reads the signature written by the master node 21 on the storage volume 60, which identifies the storage volume 60 as being the same storage volume 60 as seen by the master node 21, and enables the shared file system 230 on the server node 20 to access the new storage volume 60. The builder component 522 updates the volume container record 585 with updates to a server node record 620 for the server node 20, and to a storage volume record 610 for the created storage volume 60.

Steps 770 and 780 are repeated for all server nodes 20 until the newly created storage volume is provisioned to all server nodes 20 sharing the file system 230. In the example, the steps are repeated for "Node 3". The request is now complete 790. The storage volume 60 is now available to the shared file system 230, and may be used by applications running on the server nodes 20, 21. On completion of the request 790 the modified volume container 585 comprises storage volume records 610 and server node records 620 for all server nodes 20, 21 sharing the shared file system 230.

In an embodiment, correlation is only performed by the modified storage provisioning tool 500 with device name information provided by the master node 21. Other server nodes 20 of the shared file system 230 read the signature of the shared file system 230 that was written on the storage volume 60 by the master node 21 to identify the storage volume 60 as being the same storage volume 60 as seen by the master node 21. An alternative embodiment, where a shared file system 230 signature is not written on the storage volume 60 by the shared file system 230, is for the modified storage provisioning tool 500 to perform correlation with device name information provided by all server nodes 20, 21 to uniquely identify the storage volume 60 on each server node 20, 21. After a device name has been assigned by the server node 20, 21 to the physical volume 260, the device name is transmitted to the modified provisioning tool 500. For each server node 20, 21 correlation is used to determine the OS 200 device name for the storage volume 60 and this device name is then used to identify the storage volume 60 to the shared file system 230 for that server node 20, 21. The storage volume records 610 are extendable with additional attributes to define the server nodes 20, 21 that the storage volume 60 is mapped to and the OS 200 device name that the storage volume 60 is known by each of the server nodes 20, 21. The modified volume container 585 comprises a record that each device name and "UID1" refer to the same storage volume 60 "SV1".

In an embodiment multiple storage volumes 60 are uniquely identified by correlation for the master node 21 when they are presented to be added to one or more shared file systems 230 or storage pools of a shared file system 230. Where multiple storage volumes 60 are provisioned at the same time, correlation enables the unique identification of each storage volume 60 such that it may be correctly allocated to the desired shared file system 230 or shared file system 230 storage pool. Such correlation enables the successful provisioning of storage volumes 60 with a desired QoS attributes to a shared file system 230 or storage pool of such a shared file system 230.

The volume container 585 is also used whenever administration actions need to be performed. By creating and maintaining these volume container records 610, 620 changes to the shared file system 230 due to server node subsystem 15 or storage subsystem 90 changes can easily be controlled. Examples of such changes are adding additional server nodes 20, 21 or additional storage volumes 60 to the shared file system 230. Changes to the SAN system 10 may be detected by a detector component 532. For example, changes to a storage volume's status is immediately reflected for all server nodes 20, 21 rather than having to update one record at a time.

During de-provisioning of a storage volume 60 from a shared file system 230, the server node 20, 21 device name attributes stored with the storage volume record 610 are used to ensure that the physical volume 260 is deleted from the OS 200 on each server node 20, 21 when the storage volume 60 is removed.

In an embodiment, addition of a new storage volume record 610 to the volume container 585 triggers the process to assign the storage volume 60 to all server nodes 20, 21 defined in the volume container 585.

In an embodiment, addition of a server node record 620 to the volume container 585 triggers the process to assign all storage volumes 60 already defined in the volume container 585 to the new server node 20.

In an embodiment, a modified volume container 585 for a shared file system 230 comprises server node records 620 for the server nodes 20, 21 sharing the file system, and storage volume records 610. In an alternative embodiment, a modified volume container 585 comprises pointers to a plurality of server node records 620, and storage volume records 610, stored in the volume container store 580.

In an embodiment, accurate provisioning of storage volumes 60 to different storage pools of a shared file system 230 with specified QoS characteristics is enabled.

In addition to adding and removing storage to a SAN, storage administrators also have a number of other scenarios to handle. In an embodiment the following processes are supported: Creating a new shared file system 230 for a new or existing cluster of server nodes 20, 21; adding a new server node 20 to a shared file system 230; removing a server node; and, reducing or removing a shared file system 230.

It is understood that in addition to being implemented as an apparatus and method, the present invention may be provided as a computer program product stored on a computer readable storage medium, which when executed by a computer, implements the present invention. To this extent, the computer readable storage medium may include program code, which implements the processes and systems described herein. It is understood that the term computer readable storage medium comprises one or more of any type of physical embodiment of the program code. For example, the computer readable storage medium can comprise program code embodied on one or more portable storage articles of manufacture (e.g., a compact disc, a magnetic disk, a tape, etc.), on one or more data storage portions of a computing device, such as memory and/or a storage system, etc.

The foregoing description of the invention has been presented for purposes of illustration and description. It is not intended to be exhaustive or to limit the invention to the precise form disclosed, and many modifications and variations are possible. Such modifications and variations are intended to be included within the scope of this invention as defined by the accompanying claims.

The invention claimed is:

1. A provisioning apparatus for provisioning a storage volume to a shared file system in a storage area network, the apparatus comprising:
at least one computing device implemented in hardware including:
a creator component for transmitting an instruction to one of a plurality of storage devices in a storage area network to create a new storage volume, wherein the storage area network comprises a plurality of server nodes, wherein each of the plurality of server nodes comprises a shared file system shared by each of the plurality of server nodes, and wherein each of the plurality of server nodes communicates with each of the plurality of storage devices;
a messenger component for instructing a master server node of the plurality of server nodes to detect the created storage volume and to allocate a device name to the created storage volume;
an instructor component for instructing the master server node to assign the created storage volume to the shared file system;
an instructor component for associating the device name with the shared file system;
a receiver component for receiving a first identifier associated with the created storage volume and a second identifier associated with the device name of the created storage volume;
a builder component for determining from the received first identifier and the received second identifier a relationship between the created storage volume and the master server node;
a detector component for detecting changes to a status of one of the plurality of storage devices associated with the storage area network system and updating the status for each of the plurality of server nodes; and
for each additional server node of the plurality of server nodes:
an additional messenger component for instructing the additional server node of the plurality of server nodes to detect the created storage volume and to allocate a device name to the created storage volume on the additional server node of the plurality of server nodes;
an additional instructor component for associating the device name on the additional server node of the plurality of server nodes with the shared file system;
an additional receiver component for receiving a plurality of second identifiers associated with the device name of the created storage volume on the additional server node of the plurality of server nodes; and
an additional builder component for determining from the received first identifier and the plurality of received second identifiers a relationship between the created storage volume and the shared file system.

2. The apparatus as claimed in claim 1, further comprising:
a component for updating a first record associated with the shared file system, wherein the first record comprises a second record associated with the received first identifier, a third record associated with the second received identifier, and a plurality of fourth records associated with each of a plurality of server nodes.

3. The apparatus as claimed in claim 2, wherein:
the first record comprises a modified volume container for storing a relationship between the created storage volume and the shared file system.

4. The apparatus as claimed in claim 2, wherein the second record comprises a storage volume record.

5. The apparatus as claimed in claim 2, wherein the third record comprises a server node record.

6. The apparatus as claimed in claim 2, wherein the fourth record comprises a server node record.

7. The apparatus as claimed in claim 1, wherein the storage volume comprises a physical volume.

8. The apparatus as claimed in claim 1, wherein the storage volume comprises a logical volume.

9. The apparatus as claimed in claim 1, further comprising:
a transmitter component for transmitting an instruction to a device associated with the storage area network system for creating a communication path between the plurality of server nodes associated with the storage area network system and the storage volumes associated with the storage area network system.

10. A method for provisioning a storage volume to a shared file system in a storage area network, the method comprising:
transmitting an instruction to one of the plurality of storage devices in a storage area network to create a new storage volume, wherein the storage area network comprises a plurality of server nodes, wherein each of the plurality of server nodes comprises a shared file system shared by each of the plurality of server nodes, and wherein each of the plurality of server nodes communicates with each of the plurality of storage devices;
instructing a master server node of the plurality of server nodes to detect the created storage volume and to allocate a device name to the created storage volume;
instructing the master server node to assign the created storage volume to the shared file system;
associating the device name with the shared file system;
receiving a first identifier associated with the created storage volume and a second identifier associated with the device name of the created storage volume;
determining from the received first identifier and the received second identifier a relationship between the created storage volume and the master server node;
detecting changes to a status of one of the plurality of storage devices associated with the storage area network system and updating the status for each of the plurality of server nodes; and
for each additional server node of the plurality of server nodes:
instructing the additional server node of the plurality of server nodes to detect the created storage volume and to allocate a device name to the created storage volume on the additional server node of the plurality of server nodes;
associating the device name on the additional server node of the plurality of server nodes with the shared file system;
receiving a plurality of second identifiers associated with the device name of the created storage volume on the additional server node of the plurality of server nodes; and
determining from the received first identifier and the plurality of received second identifiers a relationship between the created storage volume and the shared file system.

11. The method as claimed in claim 10, further comprising:
updating a first record associated with the shared file system, wherein the first record comprises a second record associated with the received first identifier, a third record associated with the second received identifier, and a plurality of fourth records associated with each of a plurality of server nodes.

12. The method as claimed in claim 11, wherein the first record is a modified volume container for storing a relationship between the created storage volume and the shared file system.

13. The method as claimed in claim 11, wherein the second record is a storage volume record.

14. The method as claimed in claim 11, wherein the third record is a server node record.

15. The method as claimed in claim 11, wherein the fourth record is a server node record.

16. The method as claimed in claim 10, wherein the storage volume is a physical volume.

17. The method as claimed in claim 10, wherein the storage volume is a logical volume.

18. The method as claimed in claim 10, further comprising:
    transmitting an instruction to a device associated with the storage area network system for creating a communication path between the plurality of server nodes associated with the storage area network system and the storage volumes associated with the storage area network system.

19. A computer program product stored on a non-transitory computer readable medium and loadable into the internal memory of a digital computer, comprising software code portions for performing, when said product is run on a computer, the steps of:
    transmitting an instruction to one of a plurality of storage devices in a storage area network to create a new storage volume, wherein the storage area network comprises a plurality of server nodes, wherein each of the plurality of server nodes comprises a shared file system shared by each of the plurality of server nodes, and wherein each of the plurality of server nodes communicates with each of the plurality of storage devices;
    instructing a master server node of the plurality of server nodes to detect the created storage volume and to allocate a device name to the created storage volume;
    instructing the master server node to assign the created storage volume to the shared file system;
    associating the device name with the shared file system;
    receiving a first identifier associated with the created storage volume and a second identifier associated with the device name of the created storage volume;
    determining from the received first identifier and the received second identifier a relationship between the created storage volume and the master server node;
    detecting changes to a status of one of the plurality of storage devices associated with the storage area network system and updating the status for each of the plurality of server nodes; and
    for each additional server node of the plurality of server nodes:
        instructing the additional server node of the plurality of server nodes to detect the created storage volume and to allocate a device name to the created storage volume on the additional server node of the plurality of server nodes;
        associating the device name on the additional server node of the plurality of server nodes with the shared file system;
        receiving a plurality of second identifiers associated with the device name of the created storage volume on the additional server node of the plurality of server nodes; and
        determining from the received first identifier and the plurality of received second identifiers a relationship between the created storage volume and the shared file system.

* * * * *